(12) United States Patent
Noro

(10) Patent No.: US 6,369,467 B1
(45) Date of Patent: Apr. 9, 2002

(54) HOT STAND-BY SWITCHING APPARATUS

(75) Inventor: Atsushi Noro, Fukushima (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/435,447

(22) Filed: Nov. 22, 1999

(30) Foreign Application Priority Data

Dec. 15, 1998 (JP) .......................................... 10-356536

(51) Int. Cl.$^7$ ............................................... H04B 1/74
(52) U.S. Cl. ..................................... 307/125; 307/116
(58) Field of Search ................................ 307/116, 125, 307/126, 129, 131

(56) References Cited

U.S. PATENT DOCUMENTS

| | | | | |
|---|---|---|---|---|
| 4,748,423 A | * | 5/1988 | Jinich | 330/295 |
| 5,073,974 A | * | 12/1991 | Nishimura | 455/103 |
| 5,212,804 A | * | 5/1993 | Choate | 455/33.1 |
| 5,708,684 A | * | 1/1998 | Ueda | 375/358 |
| 5,886,427 A | * | 3/1999 | Yamazaki | 307/112 |

FOREIGN PATENT DOCUMENTS

| | | |
|---|---|---|
| JP | 60-240228 | 11/1985 |
| JP | 63-26141 | 2/1988 |
| JP | 2-116117 | 9/1990 |
| JP | 3-270515 | 12/1991 |
| JP | 7-7457 | 1/1995 |
| JP | 07-22989 | 1/1995 |
| JP | 9-331275 | 12/1997 |
| JP | 10-150387 | 6/1998 |

OTHER PUBLICATIONS

Patent Abstracts of Japan, vol. 015, No. 143, Apr. 11, 1991 (corresponds to JPA 3–19530, published Jan. 28, 1991).
Patent Abstracts of Japan, vol. 1999, No. 13, Nov. 30, 1999 (corresponds to JPA 11–239063, published Aug. 31, 1999).
Patent Abstracts of Japan, vol. 007, No. 107, May 11, 1983 (corresponds to JPA 58–29228, published Feb. 21, 1983).
Patent Abstracts of Japan, vol. 1998, No. 04, Mar. 31, 1998 (corresponds to JPA 9–331275, published Dec. 22, 1997).

* cited by examiner

*Primary Examiner*—Fritz Fleming
(74) *Attorney, Agent, or Firm*—Sughrue Mion, PLLC

(57) ABSTRACT

To provide a hot stand-by switching apparatus which is cheaper and more reliable than a conventional RF power switching device. Further, Output level and frequencies during rise and fall times are stabilized. The hot stand-by apparatus of the present invention comprises coupler for outputting either the active signal or the preparative signal, active and preparative transmitters, and switches which are connected with the input terminals of transmitters, respectively.

5 Claims, 5 Drawing Sheets

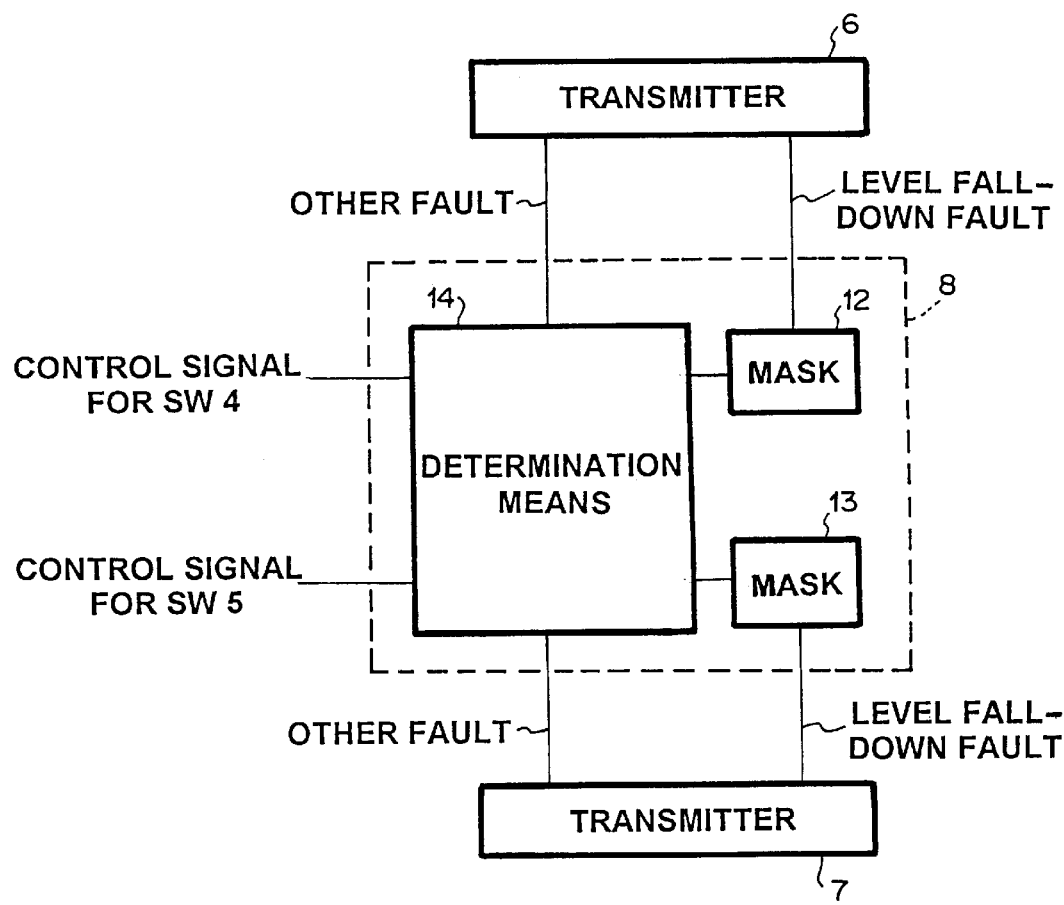
F I G.3

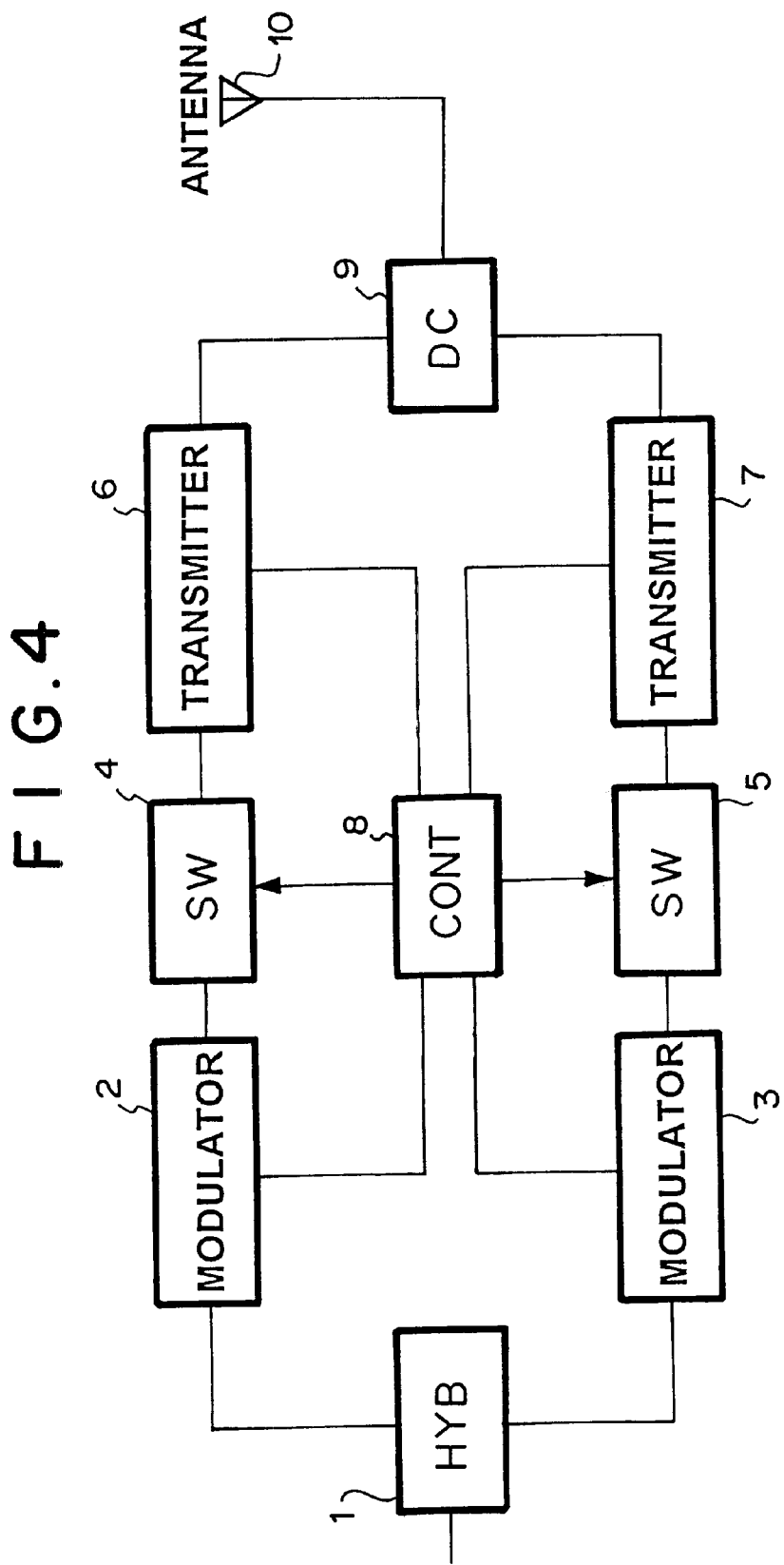

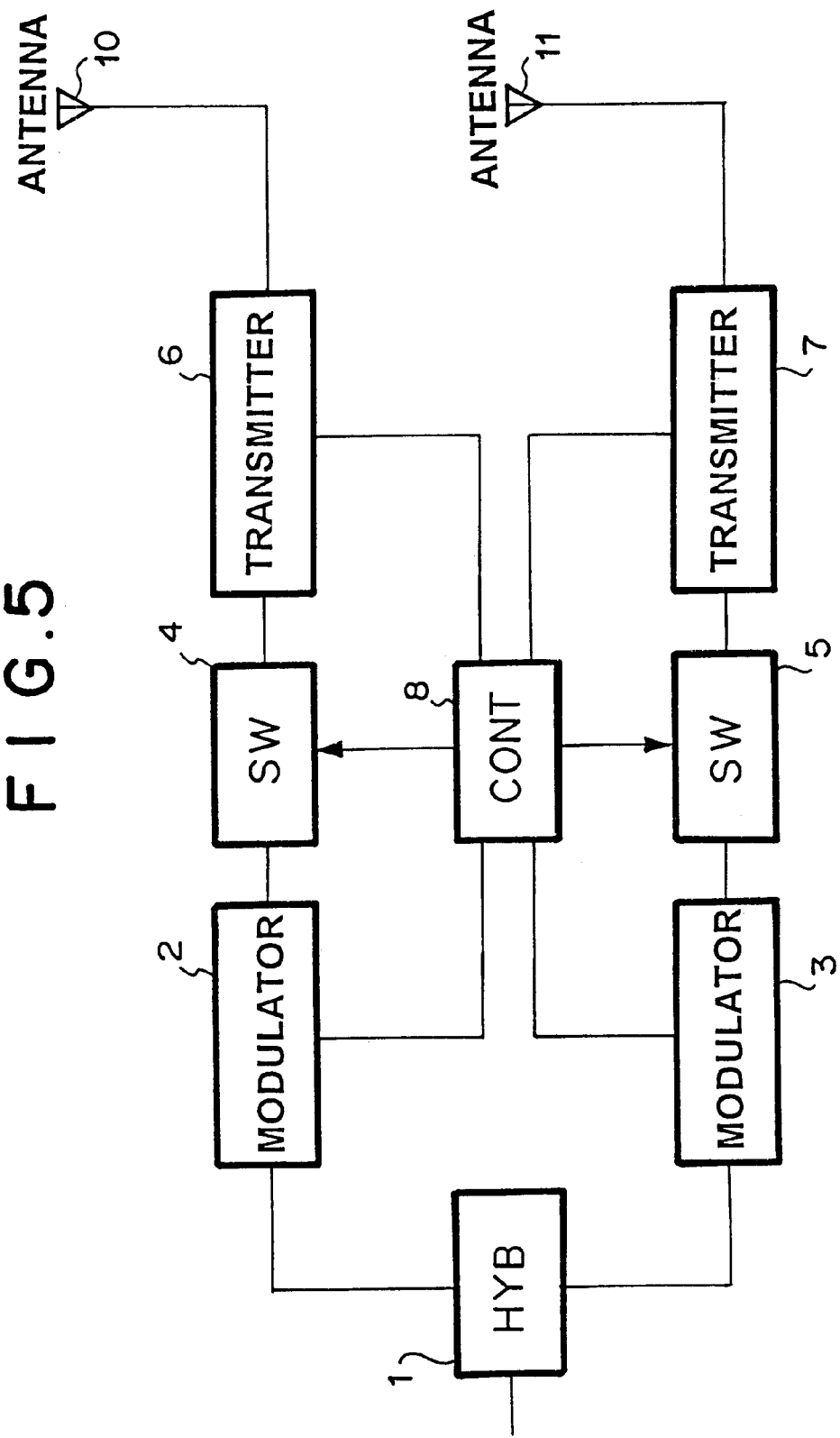

HOT STAND-BY SWITCHING APPARATUS

BACKGROUND OF THE INVENTION

1. Technical Field of the Invention

The present invention relates to a hot stand-by switching apparatus which comprises a signal output means for outputting an active signal, or a preparative signal, and switches connected with the input terminals of an active transmitter and a preparative transmitter, respectively.

2. Description of the Prior Art

Conventionally, switching means for replacing an active power amplifier by an preparative power amplifier are connected with the output terminals of these amplifiers, as disclosed, for example, in JP 9-331275 A (1997).

Further, one of the conventional hot stand-by switching apparatus as disclosed in JP 3-270515 A (1991) comprises a directional coupler, wherein local oscillators, power sources for the local oscillators, and variable attenuators for transmitters are controlled.

However, the switching devices for RF power are expensive. Further, the conventional hot-stand-by switching apparatuses as mentioned above are poor in reliability, because only one switching device is employed commonly for both of the active and preparative circuits.

Furthermore, the time required for switching becomes long and the switching control becomes complicated, because sequential controls for stabilization are required, when stability at the times of rise-up and fall-down in frequency and output level of the above-mentioned oscillators and variable attenuators is not sufficiently high.

SUMMARY OF THE INVENTION

Therefore, an object of the present invention is to provide a hot stand-by switching apparatus which utilizes cheaper switching devices for high power RF signal.

Further, another object of the present invention is to provide a hot stand-by switching apparatus which stabilizes the frequency and the output level at the rise and fall times.

The hot stand-by switching apparatus of the present invention comprises a first transmitting means and a second transmitting means, wherein the first transmitting means comprises a first modulator, a first switch for turning on and off the output from the first modulator, and a first transmitter for amplifying the output from the first modulator through the first switch, and, likewise, the second transmitting means comprises a second modulator, a second switch for turning on and off the output from the second modulator, and a second transmitter for amplifying the output from the second modulator through the second switch. Furthermore, the hot stand-by switching apparatus of the present invention comprises a distributor for distributing an input signal to the first and second modulator, and a controller which selects the other transmitter, when one of the above two transmitters does not work well.

In short, the hot stand-by switching apparatus of the present invention comprises a signal output means for outputting an active signal, or a preparative signal, and switches connected with the input terminals of an active transmitter and a preparative transmitter, respectively.

According to the present invention, the hot stand-by switching apparatus is cheap and reliable, because a passive device such as a coupler or a directional coupler is employed as a switching means for turning off the active side and turning on the preparative side. Further, the switching device is cheaper and more reliable than the RF power switch, because the switching is executed in an intermediate frequency range.

Further, according to the present invention, the rise time and fall time for switching become shorter than in the conventional case wherein the oscillator or variable attenuator is controlled. Furthermore, any sequential control is not required at all, because the stability in frequency or output level is not irrelevant at all.

BRIEF EXPLANATION OF THE DRAWINGS

FIG. 3 is a block diagram of the hot stand-by switching apparatus of the present invention which can detect a fall down in the output level in the active transmitter.

FIG. 4 is a block diagram of the hot stand-by switching apparatus of the present invention which is provided with a directional coupler.

FIG. 5 is a block diagram of the hot stand-by switching apparatus of the present invention wherein antennas are connected with the active and preparative transmitters.

PREFERRED EMBODIMENT OF THE INVENTION

Figure 1:
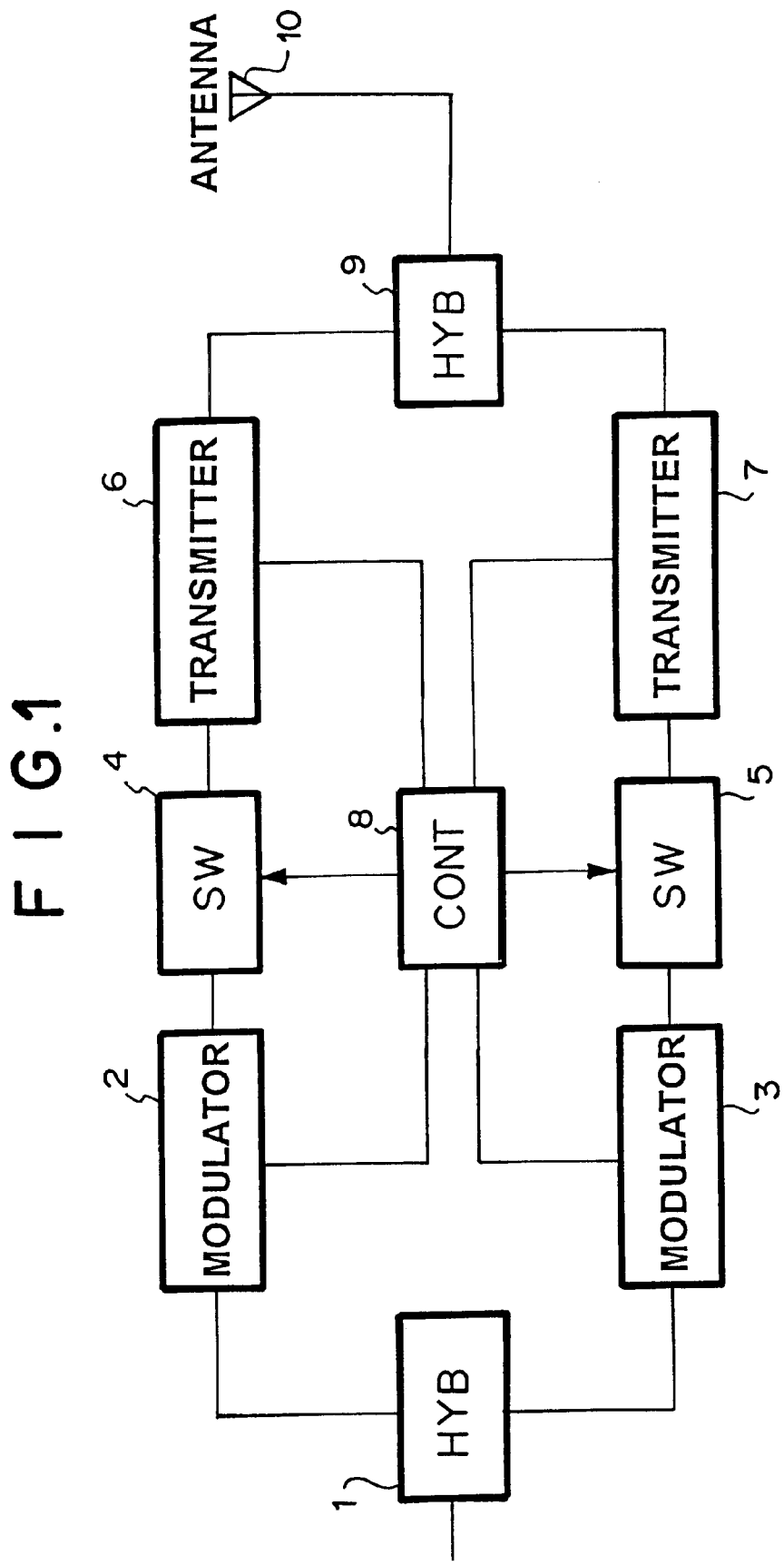
FIG. 1 is a block diagram of the hot stand-by switching apparatus of the present invention.

Preferred embodiment of the present invention is explained, referring to the drawings.

A block diagram of the hot stand-by switching apparatus of the present invention is shown in FIG. 1. As shown in FIG. 1, the input signal is branched into two signals by distributor (HYB) 1. One of the branched signals is modulated by modulator 2, is inputted into switch (SW) 4, and amplified by transmitter 6, while another branched signal is modulated by modulator 3, is inputted into switch (SW) 5, and amplified by transmitter 7. Further, the outputs from transmitters 6 and 7 are inputted into coupler (HYB) 9 which is connected with antenna 10.

Controller (CONT) 8 controls SW 4 and SW 5 on the basis of the outputs from modulators 2 and 3 and transmitters 6 and 7.

Figure 2:
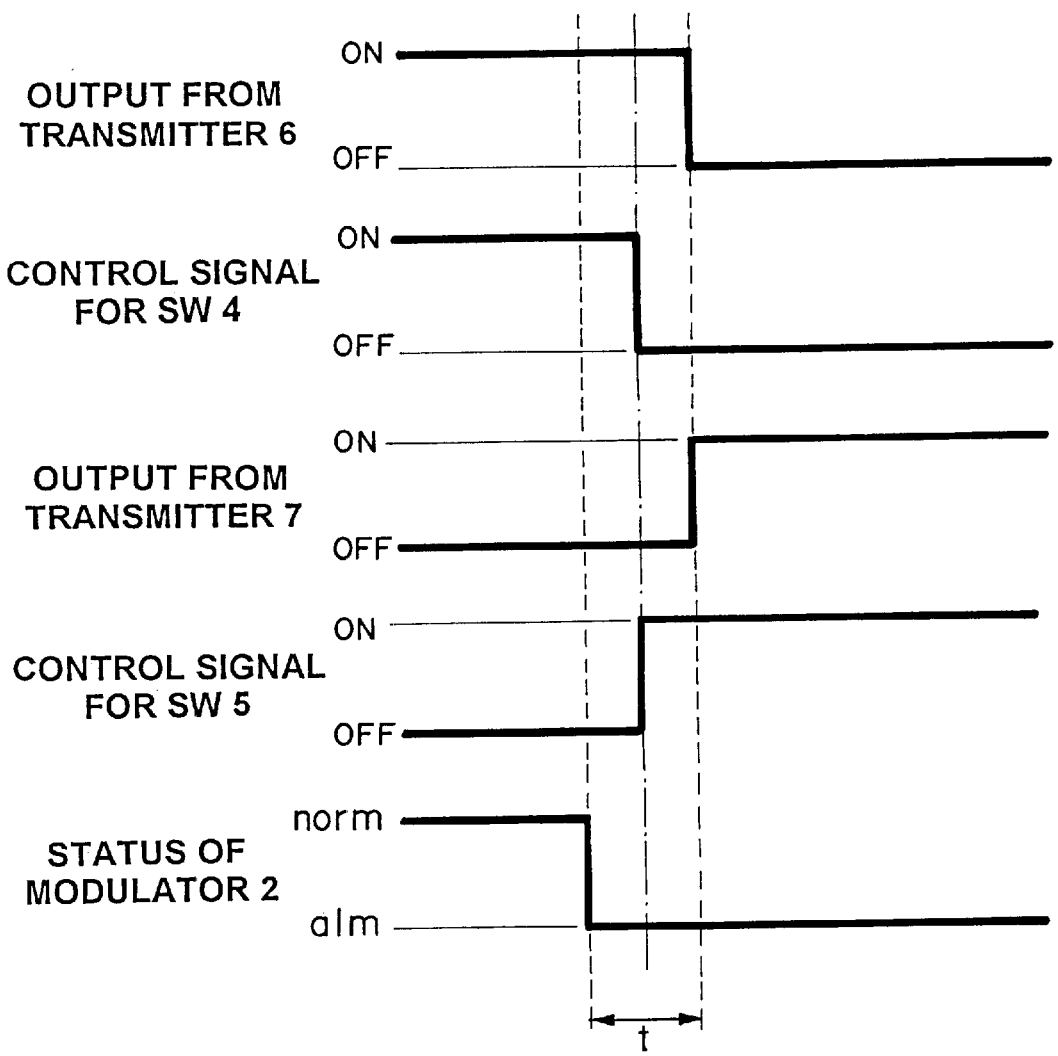
FIG. 2 is a time chart for explaining the operation of the hot stand-by switching apparatus of the present invention.

A time chart for explaining the operation of the hot stand-by switching apparatus of the present invention is illustrated in FIG. 2. It is assumed that the active circuit comprises modulator 2, SW 4, and transmitter 6, while the preparative circuit comprises modulator 3, SW 5, and transmitter 7.

When modulator 2 malfunctions, the normal state (NORM) of malfunction status information inputted into CONT 8 is changed into the alarm state (ALM).

The, CON 8 knows a trouble in modulator 2, outputs a control signals for switching on SW5. According to these control signals, the active transmitter 6 is switched off, while the preparative transmitter 7 is switched on.

In place of the modulator status, the information that indicate the fall down in the output level of the active transmitter 6 may be inputted into CONT 8.

As shown in FIG. 3, two kinds of signals from transmitters 6 and 7 may be inputted into masks 12 and 13, respectively. One of the two kinds of signals is to indicate the fall down in the output level of transmitter 6, or 7, while the other is to indicate any other malfunction excluding the fall down in the output level. Mask 12 relays to determination means 14 a signal which indicates that the output level of the transmitter 6 falls down, while mask 13 relays also to determination means 14 a signal which indicates that the output level of the transmitter 7 falls down.

Coupler (HYB) 9 may be replaced by directional coupler.

As shown in FIG. 4, directional coupler (DC) 9 connected with antennae 10 may have, for example, 0 dB port for the active side and 10 dB port in order to give the active side a priority over the preparative side. In this case, the active transmitter is higher than the preparative transmitter.

Further, transmitters 6 and 7 may be connected with antennas 10 and 11, respectively.

The outputs from both of transmitters 6 and 7 are radiated from antennas 10 and 11, respectively. Therefore, the intensity levels of transmitted waves become high.

What is claimed is:

1. A hot stand-by switching apparatus which comprises:
    a first transmitting means including a first modulator connected to a first switch for turning on and off the output from said first modulator, and a first transmitter connected to said first switch for amplifying the output from said first switch;
    a second transmitting means including a second modulator connected to a second switch for turning on and off the output from said second modulator, and a second transmitter connected to said second switch for amplifying the output from said second switch;
    a distributor connected to said first modulator and second modulator for distributing an input signal to said first and second modulators; and
    a controller connected to said first and second modulators, said first and second transmitters and said first and second switches, which selects either said first transmitter or said second transmitter,
    wherein said controller selects said second transmitter by switching off said first switch, when said first transmitting means malfunctions, while said controller selects said first transmitter by switching off said second switch, when said second transmitting means malfunctions.

2. The hot stand-by switching apparatus according to claim 1, which further comprises a coupler, connected to said first and second transmitter, for coupling the outputs from said first and second transmitters.

3. The hot stand-by switching apparatus according to claim 2, wherein said coupler is a directional coupler.

4. The hot stand-by switching apparatus according to claim 1, which further comprises a first antenna for propagating the output from said first transmitter, and a second antenna for propagating the output from said second transmitter.

5. The hot stand-by switching apparatus according to claim 1, wherein said controller further comprises a first mask for relaying a signal indicating a fall-down in the output level of said first transmitter, a second mask for relaying a signal indicating a fall-down in the output level of said second transmitter, and a determination means for generating control signals for controlling said first and second switches on the basis of the outputs from said first and second masks in order to select either said first transmitter, or said second transmitter.

* * * * *